United States Patent
Arthaud-Berthet et al.

(10) Patent No.: US 12,139,952 B2
(45) Date of Patent: Nov. 12, 2024

(54) BODYWORK PART WITH INTEGRATED ANTI-PINCHING SYSTEM

(71) Applicant: COMPAGNIE PLASTIC OMNIUM SE, Lyons (FR)

(72) Inventors: Sébastien Arthaud-Berthet, Sainte-Julie (FR); David Tresse, Sainte-Julie (FR); Patrice Miquel, Sainte-Julie (FR)

(73) Assignee: COMPAGNIE PLASTIC OMNIUM SE, Lyons (FR)

( * ) Notice: Subject to any disclaimer, the term of this patent is extended or adjusted under 35 U.S.C. 154(b) by 625 days.

(21) Appl. No.: 17/325,536

(22) Filed: May 20, 2021

(65) Prior Publication Data
US 2021/0363808 A1    Nov. 25, 2021

(30) Foreign Application Priority Data
May 20, 2020   (FR) .................................... 2005275

(51) Int. Cl.
*E05F 15/44*   (2015.01)

(52) U.S. Cl.
CPC ....... *E05F 15/44* (2015.01); *E05Y 2400/3017* (2024.05); *E05Y 2900/50* (2013.01)

(58) Field of Classification Search
CPC ........... E05Y 2800/116; E05Y 2400/44; E05Y 2400/55; E05Y 2900/546; E05Y 2900/532; E05Y 2900/548; E05F 15/44; B60J 5/107; B60R 16/0215
USPC .......................................... 180/89.1; 296/155
See application file for complete search history.

(56) References Cited

U.S. PATENT DOCUMENTS

| | | | | |
|---|---|---|---|---|
| 6,377,009 B1 * | 4/2002 | Philipp | ................... | E05F 15/46 318/266 |
| 10,329,823 B2 * | 6/2019 | Khan | ...................... | E05F 15/46 |
| 2009/0000196 A1 * | 1/2009 | Kollar | ..................... | E05F 15/43 49/28 |
| 2009/0044449 A1 * | 2/2009 | Appel | ..................... | E05F 15/46 49/502 |
| 2011/0128018 A1 * | 6/2011 | Reime | ..................... | E05F 15/46 174/70 R |
| 2014/0268604 A1 * | 9/2014 | Wicker | ................... | B29C 70/82 264/445 |
| 2015/0267454 A1 | 9/2015 | Wuerstlein et al. | | |
| 2015/0369941 A1 * | 12/2015 | Pribisic | ................... | E05F 15/44 324/658 |

FOREIGN PATENT DOCUMENTS

| | | |
|---|---|---|
| DE | 102012217086 | 3/2014 |
| EP | 2638633 B1 | 1/2018 |
| FR | 2759030 A1 | 8/1998 |
| WO | 2014019702 A1 | 2/2014 |

* cited by examiner

*Primary Examiner* — Drew J Brown
*Assistant Examiner* — Caitlin Anne Miller
(74) *Attorney, Agent, or Firm* — M&B IP Analysts, LLC

(57) ABSTRACT

A bodywork part for a motor vehicle is provided. The bodywork part includes a main body made from a plastic material and an anti-pinching system. The latter comprises a capacitive sensor comprising at least a first conductive wire integrated into the thickness of the main body by welding, said capacitive sensor being able to detect the presence of an object or a hand of a user in said peripheral zone.

16 Claims, 4 Drawing Sheets

BODYWORK PART WITH INTEGRATED ANTI-PINCHING SYSTEM

CROSS-REFERENCE TO RELATED APPLICATIONS

This application claims priority to the French Application No. FR2005275, filed 20 May 2020, now pending, the contents of which are hereby incorporated by reference.

The present disclosure relates to the automotive industry and more specifically to plastic bodywork parts intended to be mounted on a motor vehicle.

Many modern vehicles are equipped with plastic bodywork parts, for example opening elements such as tailgates or doors, equipped with a motor intended to perform the opening and closing functions. Such opening elements can be equipped with anti-pinching devices comprising capacitive sensors positioned on the periphery of the opening element, at the lateral edges.

A capacitive sensor makes it possible to detect, at a short distance, a variation in electrical capacitance due to the presence of an object or due to the presence of an object in the detection field of the sensor.

In general, such sensors therefore detect the presence of an object entering the detection field without the need for contact, by detecting a variation in electrical capacitance. The device then stops closing the tailgate before the obstacle is pinched between the opening element and the vehicle body.

Such sensors can be used to detect the presence of obstacles in many types of automotive closures such as power windows, sunroofs, side doors, sliding doors and tailgates.

Such capacitive sensors have the advantage of being able to detect the presence of all types of objects or materials at a short distance, because they are sensitive to metals and non-metals.

A capacitive sensor is based on the principle of the capacitor, the capacity of which depends in particular on the nature of the dielectric medium separating its electrodes and, on the distance, separating them. Generally, this dielectric medium is air. Thus, any object having a different dielectric constant or relative permittivity (that of air is 1) which is brought close to the electrode causes a detectable variation (for example, the permittivity of the human body is very close to that of water, which is 81). Detecting this variation makes it possible to detect the presence of the object.

One of the electrodes of the capacitor forming the sensor may consist of conductive wires or films, in particular made from metal.

The capacitive sensors currently used in the automotive industry are generally systems positioned on the opening elements, within the various sensitive areas.

The term "sensitive area" is used to refer to the area in which there is a risk of pinching. In particular, for a rear opening element, this is the zone situated between the periphery of the opening element and the body.

There is therefore a real need to position these capacitive sensors as close as possible to the sensitive area so as to be able to ensure the best possible detection there.

However, as mentioned previously, capacitive sensors are systems which must generally be positioned on the opening element and are based on conductive wires fixed to a support, the latter for example being a flexible sheath forming a bundle or a plastic box.

Consequently, these systems are bulky or rigid and are therefore difficult to integrate within the environment of the opening element, which complicates or even prevents optimal positioning as close as possible to a sensitive area to allow optimal detection.

In addition, the fixing of these added capacitive systems requires the addition of fixing elements which, depending on their nature, increase the total bulk of the capacitive system and/or can complicate the assembly step between the latter and the concerned bodywork part.

Finally, these systems are generally housed in a visible area of the opening, that is to say, an area that the user sees when the opening element is in the open position. In addition to being unsightly, such positioning presents risks, since the device can be struck or inexpertly attached by the user.

In addition, in the case of a support in the form of a sheath forming a bundle, the latter is generally fixed to the opening element via various points which are distant from each other. Each point therefore represents an at-risk point, since they can each come off under the effect of slamming or vibrations of the vehicle, thus creating unpleasant stray noises for the user.

The object of the invention is in particular to address all the drawbacks listed above.

To this end, the invention relates to a bodywork part for a motor vehicle, characterized in that it comprises a main body made from a plastic material and an anti-pinching system, the anti-pinching system comprising a capacitive sensor comprising at least a first conductive wire integrated into the thickness of the main body by welding so as to be flush with or not flush with the main body, the first conductive wire being located at least partially in a peripheral zone of said main body, said capacitive sensor being able to detect the presence of an object or a hand of a user in said peripheral zone.

Thus, the bodywork part according to the invention offers detection as close as possible to the peripheral zone of the main body and as close as possible to a targeted sensitive area. It therefore allows optimized detection by the capacitive sensor of the anti-pinching system, since the conductive wire of said sensor is integrated as close as possible to the edge of the main body of the part. In addition, the bodywork part according to the invention has the advantage of comprising an anti-pinching system while maintaining a small overall thickness in its main body. As such, by conductive wire "flush or not flush with the main body" means that the conductive wire forms, respectively, a surface in shape continuity with or a relief with respect to the neighboring surface of the main body.

Advantageously, the capacitive sensor comprises a second conductive wire integrated into the thickness of the main body by welding so as to be flush with or not flush with the main body, the second conductive wire being located at least partially in a peripheral zone of said main body.

Consequently, the detection of an object in the sensitive area by the capacitive sensor is optimized in light of the difference in capacitance between the two conductive wires generated by the presence of this object. More precisely, one of the two conductive wires is qualified as a "transmitting wire" while the other is qualified as a "receiving wire."

Advantageously, the peripheral zone is a zone extending from the edge of the main body to 20 mm from said edge. It is thus possible to detect the presence of an object as close as possible to the sensitive area. Advantageously, the peripheral zone extends from the edge of the main body to 10 mm from said edge. Even more advantageously, the peripheral zone extends from the edge of the main body to 5 mm from said edge.

Advantageously, the welding of the conductive wires is carried out by applying ultrasonic vibrations.

Thus, it is possible to create a groove in the main body and to embed the conductive wires there almost simultaneously, which makes welding both fast and reliable. Such welding can be carried out using a sonotrode via the following steps:

inserting a portion of the conductive wire in a cavity of a free end of a sonotrode, applying ultrasonic vibrations to the sonotrode and inserting the wire so as to create the groove in the plastic thickness of the main body and embed the wire there.

Advantageously, the part comprises an element attached to the main body by a bead of adhesive, the bead of adhesive covering at least one of the conductive wires.

Thus, the conductive wire (or the conductive wires) covered by the bead of adhesive is protected, which ensures the durability of the capacitive sensor and therefore offers security in detecting an object in the considered sensitive area.

Advantageously, the main body and the attached element form a sealed volume in which the first conductive wire and/or the second conductive wire is located.

The object of the invention is also a motor vehicle comprising at least one bodywork part according to any of the variants of the bodywork part of the invention.

Advantageously, the bodywork part is an opening element such as a tailgate, a side door, a hood or a sunroof.

BRIEF DESCRIPTION OF THE FIGURES

The various disclosed embodiments will be better understood upon reading the description which follows, given solely by way of example and with reference to the appended drawings in which.

DETAILED DESCRIPTION

Figure 1:
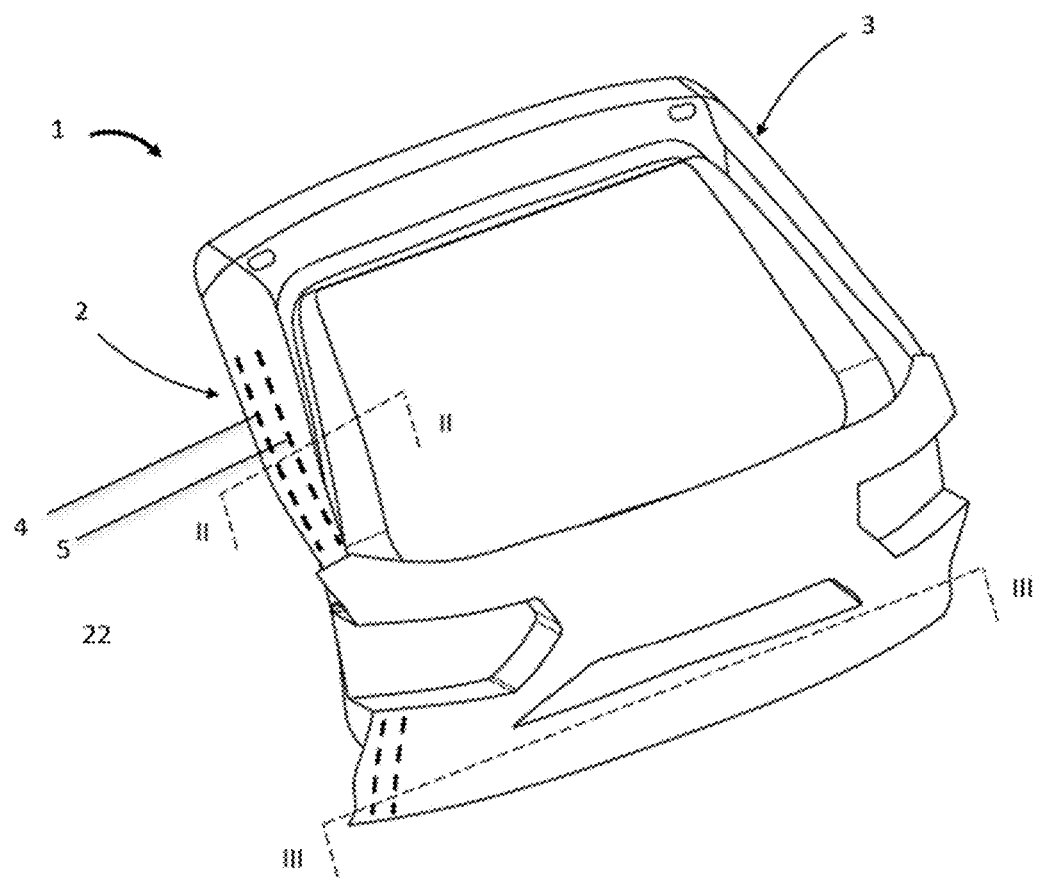
FIG. 1 is a perspective view of a motor vehicle tailgate according to one embodiment of the invention.

FIGS. 1 to 3B show a bodywork part (in the form of a tailgate) according to different embodiments of the invention, this part being designated by the general reference 1.

The bodywork part 1 according to the invention comprises a main body 2 made from a plastic material and an anti-pinching system, the anti-pinching system comprising a capacitive sensor comprising at least a first conductive wire 4 integrated into the thickness of the main body 2 by welding so as to be flush with or not flush with the main body 2, the first conductive wire 4 being located at least partially in a peripheral zone of said main body, said capacitive sensor being able to detect the presence of an object or a hand of a user (not shown) in said peripheral zone.

The part 1 as shown in FIGS. 1 to 3B comprises an insert 3, in this case an attached outer skin 3, on the main body 2. The capacitive sensor of the anti-pinching system of the part according to the invention described in these figures comprises a second conductive wire 5, which in turn is also integrated into the thickness of the main body 2 by welding so as to be flush or not flush with the main body 2. This second conductive wire 5 is also located at least partially in a peripheral zone of said main body 2.

As shown in FIG. 2A to 3B, the first conductive wire 4 and the second conductive wire 5 are welded to the main body 2 by applying ultrasonic vibrations so as to be flush and to form a relief with the neighboring surface of the main body 2. These two conductive wires 4 and 5 are elements of the capacitive sensor, which further comprises an electronic system (not shown) capable of processing the data received during the detection of an object or of a users hand. The capacitive sensor is itself a subassembly of the anti-pinching system which comprises a control system capable of controlling the actuator responsible for closing and opening the tailgate 1, so as to stop the closing or the opening of the latter if there is a risk of pinching.

The conductive wires 4 and 5 can be welded so as to be flush and thus form a flat surface with the neighboring surface of the main body 2, which further reduces the bulk located at this specific portion of the main body 2 and protects them even more from any attacks, since they are then fully embedded in the plastic material.

The conductive wires 4 and 5 are located within the peripheral zone of the main body 2, which makes it possible to optimize the detection of any pinching in this sensitive area of the vehicle, once the tailgate 1 has been assembled. The main body 2, shown in FIG. 2A to 2C, corresponds to a side upright of the tailgate 1, while it corresponds to a lower part of the tailgate 1 in FIGS. 3A and 3B.

Figure 2A:
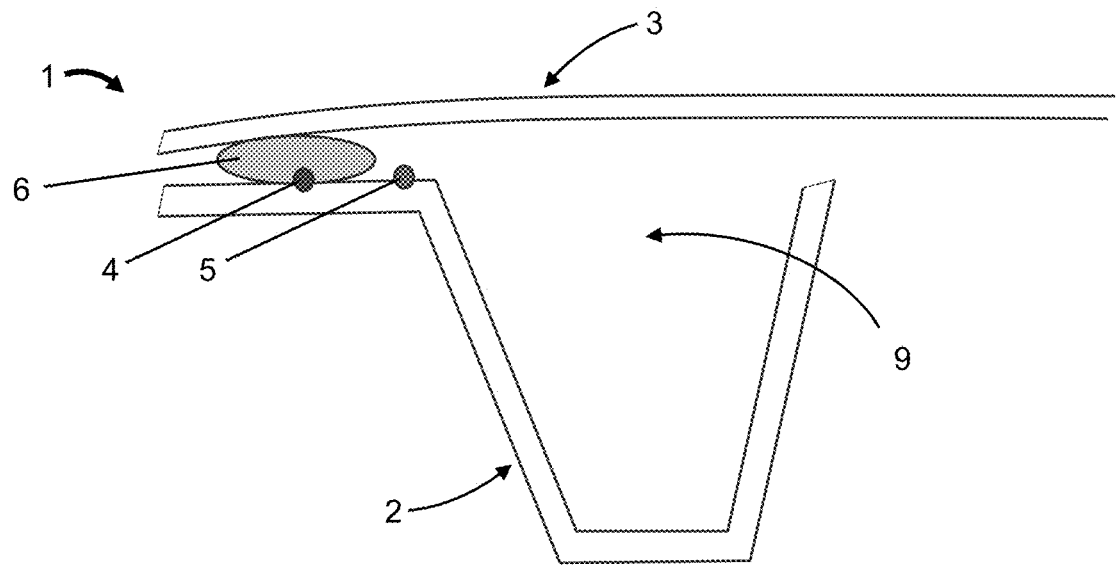
FIG. 2 is a set of sectional views (FIGS. 2A, 2B and 2C) of the tailgate of FIG. 1 along section II-II.
Figure 2B:
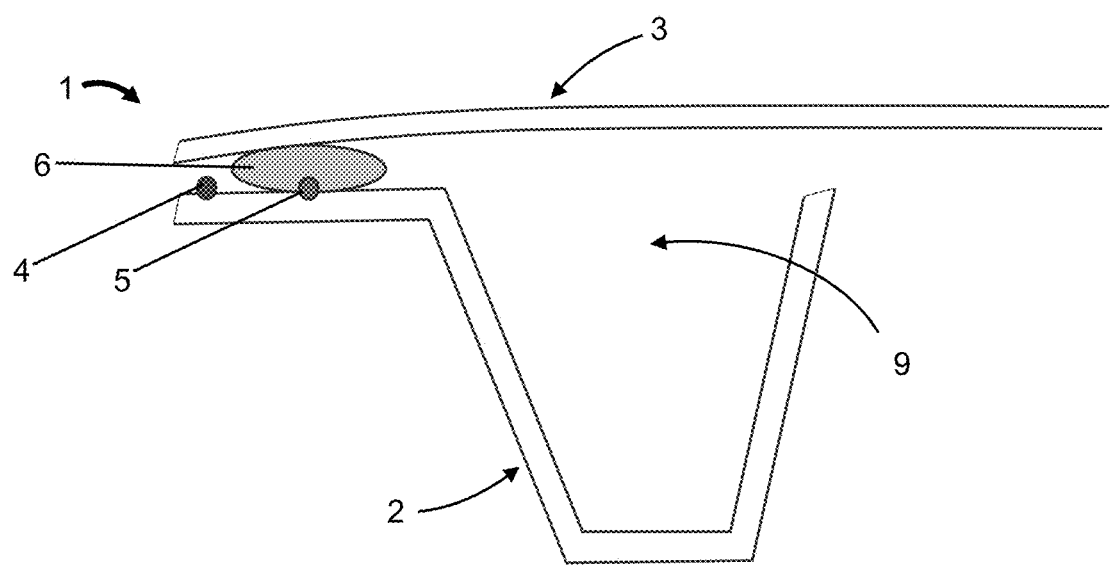
Figure 2C:
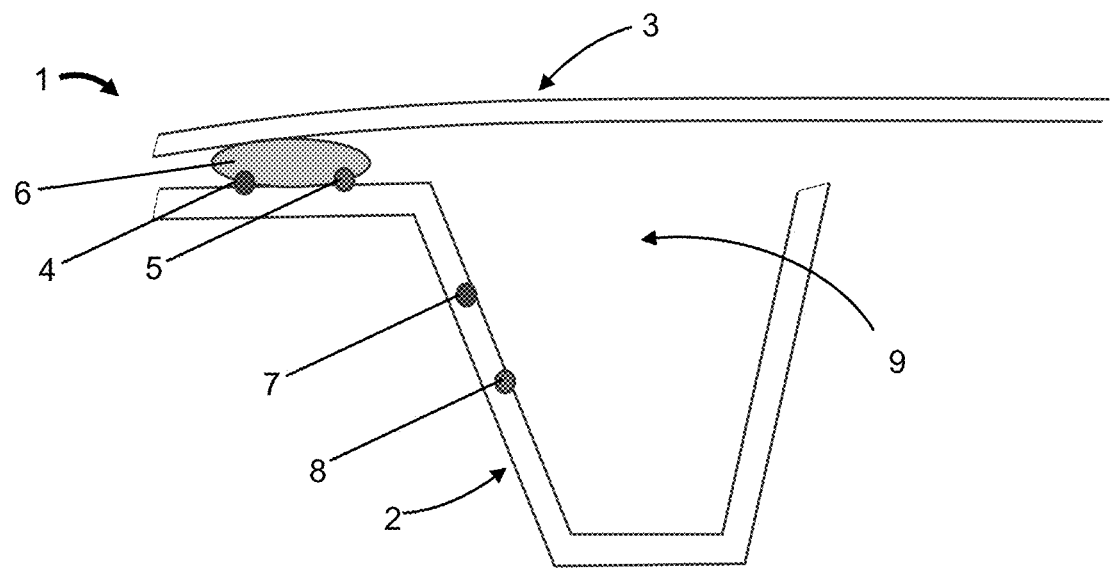
Figure 3A:
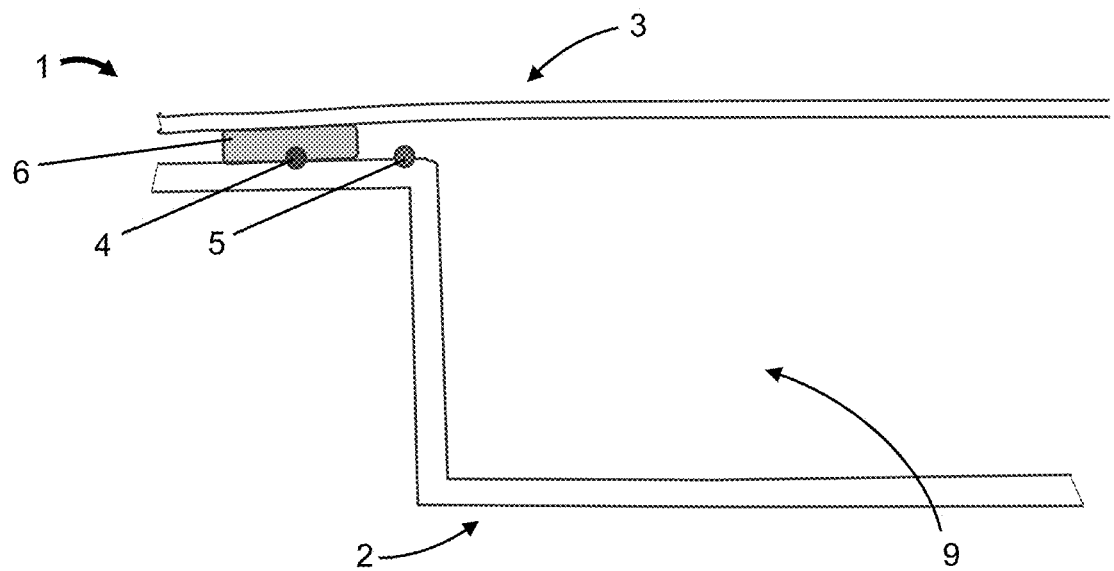
FIG. 3 is a set of sectional views (FIGS. 3A and 3B) of the tailgate of FIG. 1 along section III-III.
Figure 3B:
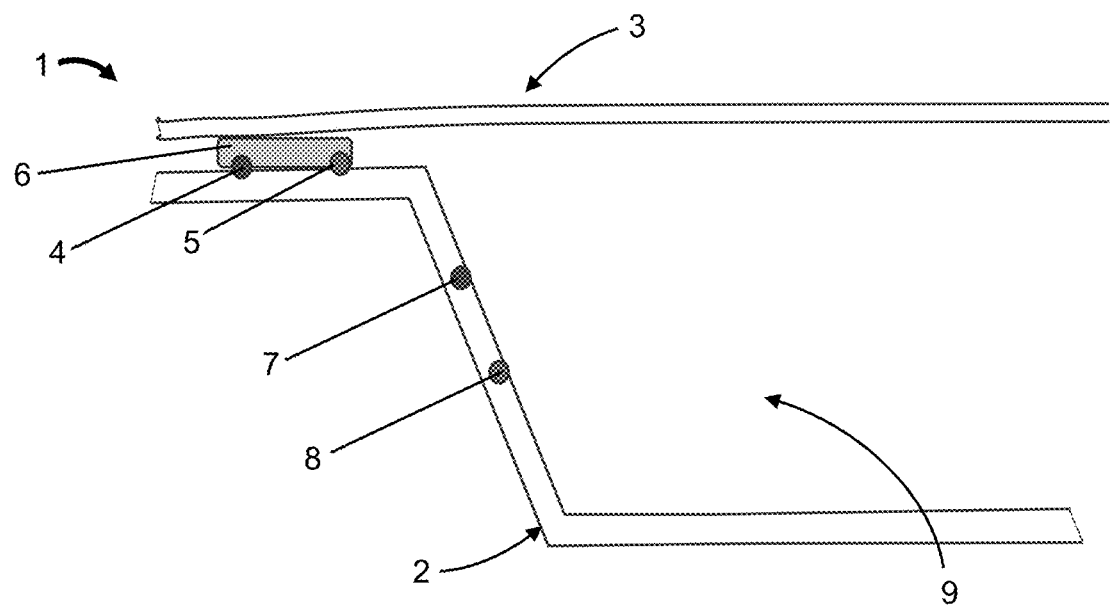

However, the vehicle may comprise other sensitive areas relating to the opening and closing of the tailgate 1, which may therefore comprise at least one other capacitive sensor, as shown in FIGS. 2C and 3B. This second capacitive sensor, the design of which is similar to that previously described, is also a subassembly of the anti-pinching system and comprises a first conductive wire 7 and a second conductive wire 8 which are welded flush with the neighboring surface of the main body 2, as close as possible to another sensitive area. Thus, the anti-pinching system has several capacitive sensors, which allows it to ensure better detection of risky situations and to refine the instructions that it transmits to the actuator of the tailgate 1.

As mentioned earlier, the tailgate 1 comprises an outer skin 3. The latter is attached to the main body 2 and is fixed by a bead of adhesive 6 located in the peripheral zone of the main body 2.

As shown in FIGS. 2A, 2B and 3A, one of the two conductive wires 4 or 5 is covered by the bead of adhesive 6, which fully protects it and ensures the durability of said wire, and therefore in fine of the capacitive sensor, over time. In a variant of the invention shown in FIGS. 2C and 3B, the two conductive wires 4 and 5 are covered by the bead of adhesive 6 and are therefore both protected by the latter. The main body 2 and the outer skin 3 form a sealed volume 9 within which it is possible to weld the conductive wires 4 and 5, this sealed volume 9 being inaccessible to the user and as close as possible to the edge. Better detection is therefore possible within the corresponding sensitive area, since the conductive wires 4 and 5 are much less likely to be damaged during use of the vehicle (not shown) on which the tailgate 1 is assembled. This configuration between the conductive wires 4 and 5 and the bead of adhesive 6 also ensures less damage to the conductive wires 4 and 5 caused by unwanted water flow, which could interfere with the operation of the sensor.

The embodiments described here, and other embodiments will become clearly apparent to a person skilled in the art. For example, the wire or one of the conductive wires can be integrated on the inner face, facing the main body, of the outer skin. When one of the conductive wires is not integrated within the sealed volume, it can preferably be integrated flush with the thickness of the main body and can thus be better protected. When the sensor is provided with two conductive wires, these can be integrated simultaneously into the thickness of the main body, which inter alia makes it possible to integrate them in parallel within the thickness of the part, relative to each other. They can also be integrated by the same device as the device performing the installation of the bead of adhesive (to do this, the device can have a head provided with a nozzle for laying the bead of adhesive and a sonotrode for integrating said wires).

LIST OF REFERENCES

1: bodywork part—tailgate
2: main body
3: outer skin
4: first conductive wire of the capacitive sensor
5: second conductive wire of the capacitive sensor
6: bead of adhesive
7: first conductive wire of a second capacitive sensor
8: second conductive wire of the second capacitive sensor
9: sealed volume

What is claimed is:

1. A bodywork part for a motor vehicle, characterized in that it comprises:
a main body made from a plastic material; and
an anti-pinching system, the anti-pinching system comprising a capacitive sensor, wherein the capacitive sensor includes at least a first conductive wire that is integrated into a thickness of the main body by welding, wherein the at least a first conductive wire is inserted into a groove of the main body to be flush with the main body, the first conductive wire is located at least partially in a peripheral zone of said main body, wherein said capacitive sensor is adapted to detect a presence of an object in said peripheral zone of the main body.

2. The bodywork part according to claim 1, wherein the capacitive sensor comprises a second conductive wire integrated into the thickness of the main body by welding to be flush with or not flush with the main body, the second conductive wire being located at least partially in a peripheral zone of said main body.

3. The bodywork part according to claim 2, wherein the peripheral zone is a zone extending from an edge of the main body to 20 mm from said edge.

4. The bodywork part according to claim 1, wherein the welding of the conductive wires is carried out by applying ultrasonic vibrations.

5. The bodywork part according to claim 2, comprising an element attached to the main body by a bead of adhesive, the bead of adhesive covering at least one of the conductive wires.

6. The bodywork part according to claim 5, wherein the main body and the attached element form a sealed volume in which the first conductive wire and/or the second conductive wire is located.

7. A motor vehicle comprising at least one bodywork part according to claim 1.

8. The motor vehicle according to claim 7, wherein the bodywork part is an opening element that is any one of: a tailgate, a side door, a hood, and a sunroof.

9. A bodywork part for a motor vehicle, characterized in that it comprises:
a main body made from a plastic material; and
an anti-pinching system, the anti-pinching system comprising a capacitive sensor, wherein the capacitive sensor includes at least a first conductive wire that is integrated into a thickness of the main body by welding, wherein the at least a first conductive wire is inserted into a groove of the main body to not be flush with the main body, the first conductive wire is located at least partially in a peripheral zone of said main body, wherein said capacitive sensor is adapted to detect a presence of an object in said peripheral zone of the main body.

10. The bodywork part according to claim 9, wherein the capacitive sensor comprises a second conductive wire integrated into the thickness of the main body by welding to be flush with or not flush with the main body, the second conductive wire being located at least partially in a peripheral zone of said main body.

11. The bodywork part according to claim 10, wherein the peripheral zone is a zone extending from an edge of the main body to 20 mm from said edge.

12. The bodywork part according to claim 9, wherein the welding of the conductive wires is carried out by applying ultrasonic vibrations.

13. The bodywork part according to claim 10, comprising an element attached to the main body by a bead of adhesive, the bead of adhesive covering at least one of the conductive wires.

14. The bodywork part according to claim 13, wherein the main body and the attached element form a sealed volume in which the first conductive wire and/or the second conductive wire is located.

15. A motor vehicle comprising at least one bodywork part according to claim 9.

16. The motor vehicle according to claim 15, wherein the bodywork part is an opening element that is any one of: a tailgate, a side door, a hood, and a sunroof.

* * * * *